US007006793B2

(12) United States Patent
Himmel et al.

(10) Patent No.: US 7,006,793 B2
(45) Date of Patent: Feb. 28, 2006

(54) SAFE USE OF ELECTRONIC DEVICES IN AN AUTOMOBILE

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 10/046,996

(22) Filed: Jan. 16, 2002

(65) Prior Publication Data

US 2003/0134660 A1    Jul. 17, 2003

(51) Int. Cl.
H04B 5/00 (2006.01)

(52) U.S. Cl. ............... 455/41.1; 455/345; 455/517; 455/41.3

(58) Field of Classification Search ............ 455/556.1, 455/557, 41.1, 418, 419, 550.1, 575.9, 334, 455/345–346, 566–567, 41.2, 41.3, 410–411, 455/517; 340/825.08; 713/200–201
See application file for complete search history.

(56) References Cited

U.S. PATENT DOCUMENTS

| 5,131,029 | A |   | 7/1992 | Kunstadt |
|-----------|---|---|--------|----------|
| 5,191,312 | A |   | 3/1993 | Altmann et al. |
| 5,301,227 | A |   | 4/1994 | Kamei et al. |
| 5,453,929 | A |   | 9/1995 | Stove |
| 5,657,317 | A | * | 8/1997 | Mahany et al. ............ 455/433 |
| 5,797,088 | A |   | 8/1998 | Stamegna |
| 6,029,110 | A |   | 2/2000 | Zuber |
| 6,052,603 | A | * | 4/2000 | Kinzalow et al. ........... 455/557 |
| 6,131,042 | A | * | 10/2000 | Lee et al. .................. 455/345 |
| 6,138,041 | A |   | 10/2000 | Yahia |
| 6,181,996 | B1 |   | 1/2001 | Chou et al. |
| 6,188,315 | B1 | * | 2/2001 | Herbert et al. ............. 340/438 |
| 6,206,452 | B1 |   | 3/2001 | Talbot |
| 6,295,457 | B1 | * | 9/2001 | Narayanaswamy ......... 455/466 |
| 6,353,778 | B1 | * | 3/2002 | Brown ......................... 701/1 |
| 6,377,825 | B1 | * | 4/2002 | Kennedy et al. ............ 455/557 |
| 6,400,958 | B1 | * | 6/2002 | Isomursu et al. ........... 455/411 |
| 6,408,232 | B1 | * | 6/2002 | Cannon et al. ......... 340/825.08 |
| 6,453,180 | B1 | * | 9/2002 | Endoh et al. ............... 455/557 |
| 6,574,455 | B1 | * | 6/2003 | Jakobsson et al. ......... 455/41.2 |

(Continued)

FOREIGN PATENT DOCUMENTS

JP    10-13502    1/1998

(Continued)

*Primary Examiner*—Lana Le
(74) *Attorney, Agent, or Firm*—Mark S. Walker; Streets & Steele; Frank J. Campigotto

(57) ABSTRACT

The present invention presents a method and computer program product for operating a mobile electronic device having a wireless transceiver within an automobile having an on-board computer. The method includes: receiving a wireless information message from the mobile electronic device within the automobile to the on-board computer, establishing a wireless communication link between the on-board computer and the mobile electronic device; communicating instructions from the on-board computer to the mobile electronic device to disable a one or more features within the mobile electronic device; and then communicating reconfiguration instructions from the on-board computer to the mobile electronic device, whereby the mobile electronic device reconfigures itself to become a slave device to the on-board computer. The motorist may then utilize the mobile electronic device through the input and output devices of the on-board computer.

43 Claims, 14 Drawing Sheets

U.S. PATENT DOCUMENTS

| | | |
|---|---|---|
| 6,697,638 B1 * | 2/2004 | Larsson et al. ............. 455/557 |
| 2002/0137489 A1 * | 9/2002 | Dutta et al. ................. 455/567 |
| 2004/0014464 A1 * | 1/2004 | Takatori et al. ............ 455/41.1 |
| 2004/0058694 A1 * | 3/2004 | Mendiola et al. ........... 455/410 |
| 2004/0204192 A1 * | 10/2004 | Holloway et al. ....... 455/575.1 |
| 2005/0153758 A1 * | 7/2005 | Broussard et al. ....... 455/575.9 |

FOREIGN PATENT DOCUMENTS

| | | |
|---|---|---|
| JP | 10-248081 | 9/1998 |
| JP | 11-112411 | 4/1999 |
| JP | 11-308664 | 11/1999 |
| JP | 11-341570 | 12/1999 |

* cited by examiner

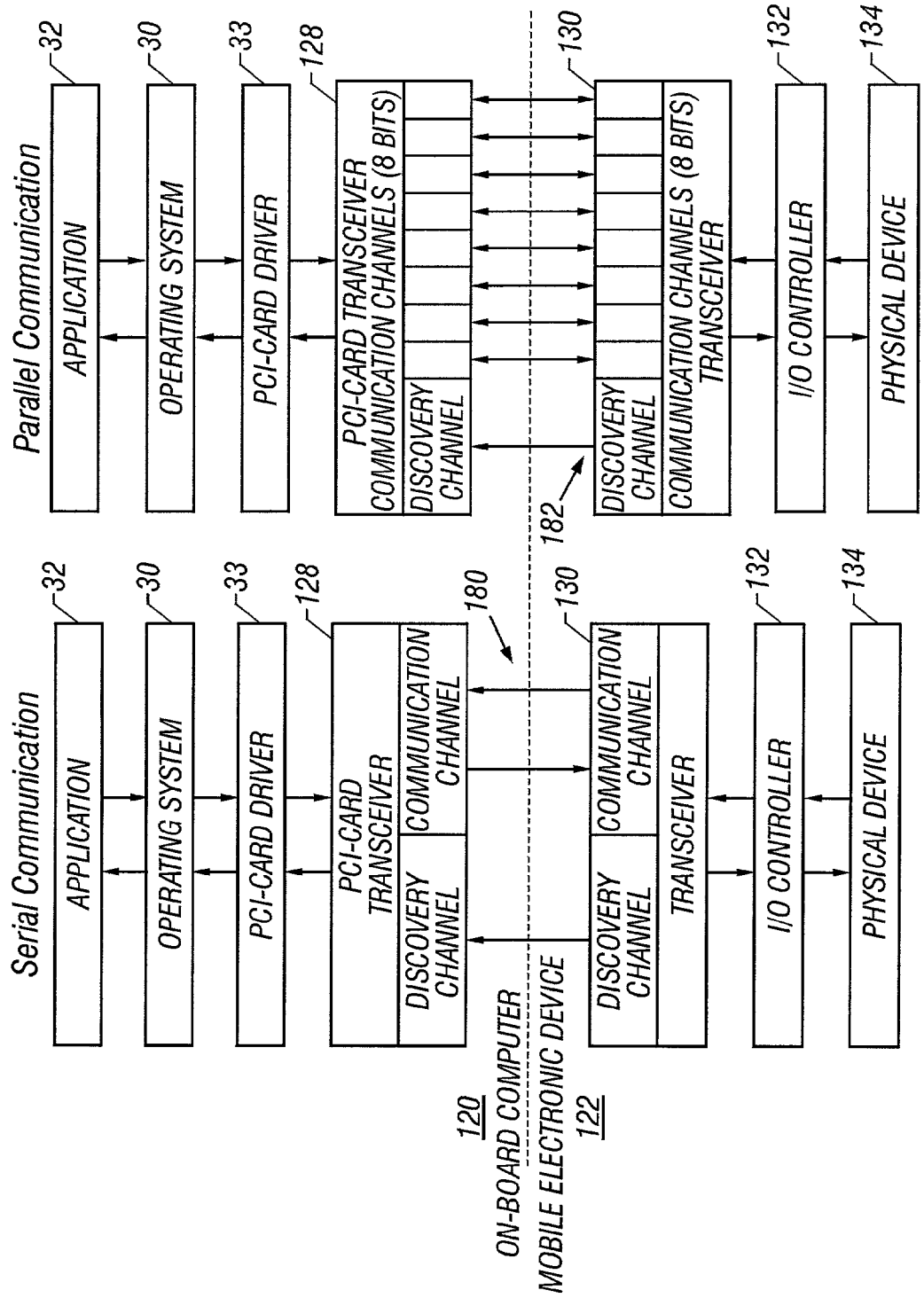

SAFE USE OF ELECTRONIC DEVICES IN AN AUTOMOBILE

BACKGROUND OF THE INVENTION

1. Field of the Invention

The present invention relates to a method and system for using electronic devices in an automobile. More particularly, the invention relates to a system and method that provides wireless communication between the automobile and various electronic devices used by the motorist and passengers of an automobile.

2. Description of the Related Art

Mobile telephones have become a part of everyday life for many people in all segments of society and have become extremely popular and indispensable tools for people who are constantly "on the go." Mobile telephones are used for maintaining contact with the office, with friends, with business associates and with family and may be found in use just about everywhere, including automobiles. When properly used, mobile telephones are quite desirable and do possess safety benefits, e.g., summoning help in an emergency. However, the possibility exists that a careless user may operate a mobile telephone in an improper manner while driving an automobile. Thus, it would be desirable to enhance the safety of operating a mobile telephone while driving an automobile or other vehicle.

While it is possible to permanently mount mobile telephones in automobiles so as to permit their use while driving, most mobile telephone users want to use them in locations other than their automobiles without having to purchase one for their automobile and another for use elsewhere. Thus, the mobile telephone of choice for most users is a "portable" mobile telephone. Portable mobile telephones are primarily battery operated, although technology exists to operate the telephone and/or charge the battery by connecting the mobile telephone and battery to a power supply, such as a vehicle's cigarette lighter.

In the setting of a vehicle, however, portable mobile telephones are cumbersome and potentially dangerous to use if the telephone is picked up with one hand. Often, in an effort to operate the mobile telephone "hands-free", drivers support the telephone between the shoulder and the neck. This effort is distracting to the driver and tends to increase the possibility of an accident. Studies have reported that drivers operating a mobile telephone are as much as four times more likely to be involved in an accident than those who are not operating a mobile telephone. In fact, certain jurisdictions throughout the world have proposed and/or enacted legislation prohibiting the use of mobile telephones in vehicles, at least to the extent that such use affects the driver's operation of the vehicle.

Previous efforts have been made to provide "hands-free" operation of mobile telephones in automobiles. These efforts have included securing the mobile telephone to the dashboard or driver's window with a positionable holder, providing remote speakers and microphones connected with wires to the mobile telephone, headsets that can be attached to the mobile telephones, voice recognition software for dialing the mobile telephone, and other similar devices. These efforts are cumbersome and a nuisance.

What is needed is a method and system that will prevent the unsafe operation of a mobile telephone or other mobile electronic device in an automobile. It would be desirable if the method and system allowed the mobile electronic device to be used to the extent that is safe under varying circumstances. It would also be desirable to utilize equipment that is already present in the automobile.

SUMMARY OF THE INVENTION

The present invention provides a method and computer program product for operating a mobile electronic device within an automobile having a computer. The mobile electronic device includes a wireless transceiver for transmitting and receiving wireless signals selected from radio frequency and infrared. The method includes: receiving a wireless information message at the on-board computer from the mobile electronic device within the automobile; establishing a wireless communication link between the on-board computer and the mobile electronic device; communicating instructions from the on-board computer to the mobile electronic device to disable one or more features within the mobile electronic device; and then communicating reconfiguration instructions from the on-board computer to the mobile electronic device, whereby the mobile electronic device reconfigures itself to become a slave device to the on-board computer. This reconfiguration enables the mobile device to use hardware in the automobile such as a microphone, speaker, antenna or display and software for voice commands.

The present invention may be applied to a wide range of mobile electronic devices selected from a mobile telephone, a handheld personal computer, a personal organizer, a palmtop computer, a computerized notepad, a global positioning system (GPS), an electronic video game, a video player, a personal digital assistant or combinations thereof.

The step of receiving the wireless identification message further comprises: transmitting a discovery signal on a discovery frequency by the on-board computer, receiving the discovery signal by the mobile electronic device, interpreting the discovery signal to be an identification request by the on-board computer, and then transmitting a wireless identification message from the mobile electronic device to the on-board computer, wherein the message contains information describing the mobile electronic device, an address for the mobile electronic device, and an address that identifies a component for each feature within the mobile electronic device.

The step of establishing a wireless communications link further comprises: storing the address for the mobile electronic device, and the address for each of the one or more features within the mobile electronic device, monitoring by the mobile electronic device for messages to the assigned address for the mobile electronic device, and monitoring by the on-board computer for messages from the assigned address for the mobile electronic device.

Consequently, the on-board computer can communicate with the mobile electronic device and disable one or more of the features within the mobile electronic device according to various criteria and operating conditions. The one or more disabled features within the mobile electronic device are selected from user input devices, user output devices, transmitters, receivers, transceivers and combinations thereof. Examples of user input and output devices include speakers, microphones, keypads, video displays, joysticks and combinations thereof. Preferably, when these features are disabled within the mobile electronic device, then one or more identical or enhanced features within the on-board computer are provided or made accessible to the mobile electronic device in accordance with methods described in more detail below.

The method of the present invention further enables the on-board computer to limit access by a driver or passengers (collectively, "motorists") of the automobile to features of the on-board computer that are being utilized in place of the disabled features of the mobile electronic device. One advantage of this aspect of the present invention is to ensure greater safety for the motorist and others on the road when the motorist is attempting to utilize the functions of the mobile electronic device. Therefore, the method further comprises: obtaining status information, using the on-board computer, about conditions affecting the automobile; and determining, using the on-board computer, which of the one or more features within the on-board computer to make available to a motorist for use with the mobile device. The conditions may be measured or sensed conditions or may be deduced, anticipated or projected conditions. The measured conditions may be selected from, for example, weather outside the automobile, speed of the automobile, braking frequency, distance to other vehicles, engine RPM, engine coolant level and temperature, steering wheel movement, automobile's acceleration, frequency of automobile's acceleration, time of day, time period of driving without a rest stop, available fuel, distance remaining to a destination, or combinations thereof. The deduced conditions may be, for example, traffic density, presence of a passenger, or erratic control or combinations thereof.

It is also a feature of the present invention to allow the on-board computer to disable features of the mobile device based on previous accident history or road hazards corresponding to a particular location that the vehicle is entering. Information about accident history or road hazards may be obtained by the on-board computer through communications with a database containing such information, perhaps provided by the relevant state department of transportation through a subscription service. Furthermore, the on-board computer may take steps to information the driver of the accident history or road hazards associated with the approaching location in addition to, or instead of, disabling one or more features.

In determining which features to make available to the motorist, the method further comprises: defining a normal value for each of the conditions and combinations of the conditions, storing the normal value in a database of the on-board computer, storing instructions in the database of the on-board computer for removing the availability of the features based upon a variance between the normal condition and an actual condition and combinations of actual conditions, determining the variance between the normal conditions and the actual conditions, removing the availability of the features based upon the instructions. In the case of a mobile telephone, the instructions may be, for example, refusal to accept a mobile telephone call, refusal to place a mobile telephone call, placing only emergency mobile telephone calls, limiting the duration of a mobile telephone call, limiting the frequency of mobile telephone calls, limiting motorist input only to voice commands, blocking output to the visual display device or combinations thereof.

The present invention further presents a system for operating a mobile electronic device within an automobile having an on-board computer, comprising: a mobile electronic device, an on-board computer mounted in an automobile, an address for the mobile electronic device, an address for one or more features within the mobile electronic device, wherein the mobile electronic device wirelessly communicates with the on-board computer, wherein the on-board computer instructs the mobile electronic device to disable one or more features within the mobile electronic device and wherein the mobile electronic device reconfigures itself to be a slave device to the on-board computer.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIGS. 6A and 6B provide a flow diagram illustrating the flow of data between an on-board computer and a wireless mobile electronic device over both a serial communication channel and a parallel communication channel.

DETAILED DESCRIPTION

The present invention provides a method and system for an on-board computer that is mounted in an automobile to wirelessly communicate with and control various electronic devices used by the motorist and passengers. The mobile electronic devices each possess a wireless transceiver. The invention enables the on-board computer to take control of the mobile electronic devices inside the automobile. These mobile electronic devices are then reconfigured for immediate use as slaves to the on-board computer, which controls the use of features or components in the mobile electronic devices, such as allowing communication with the motorist only through the input/output devices of the on-board computer.

In order for the on-board computer to take control over the mobile electronic devices, the on-board computer must discovery the mobile electronic devices and establish communications with the mobile electronic devices. Accordingly, the on-board computer transmits a discovery signal and control message to mobile electronic devices within the range of the wireless transmissions. In effect, the on-board computer is an Electronic Device Control System (EDCS)

that takes control of mobile telephones or other mobile electronic devices located inside of the automobile.

The present invention is not limited to having just one mobile electronic device being controlled by the on-board computer in the automobile. Because the connections between the on-board computer and the mobile electronic devices are wireless, it is possible for the on-board computer to control a plurality of mobile electronic devices. Furthermore, control mobile electronic devices may be accomplished without additional cables and without expensive hardware such as a multipath I/O device. The controlling of mobile electronic devices is accomplished simply by providing contention management, described in more detail below, with the interrupt controller and the operating system software of the on-board computer.

Figure 1:
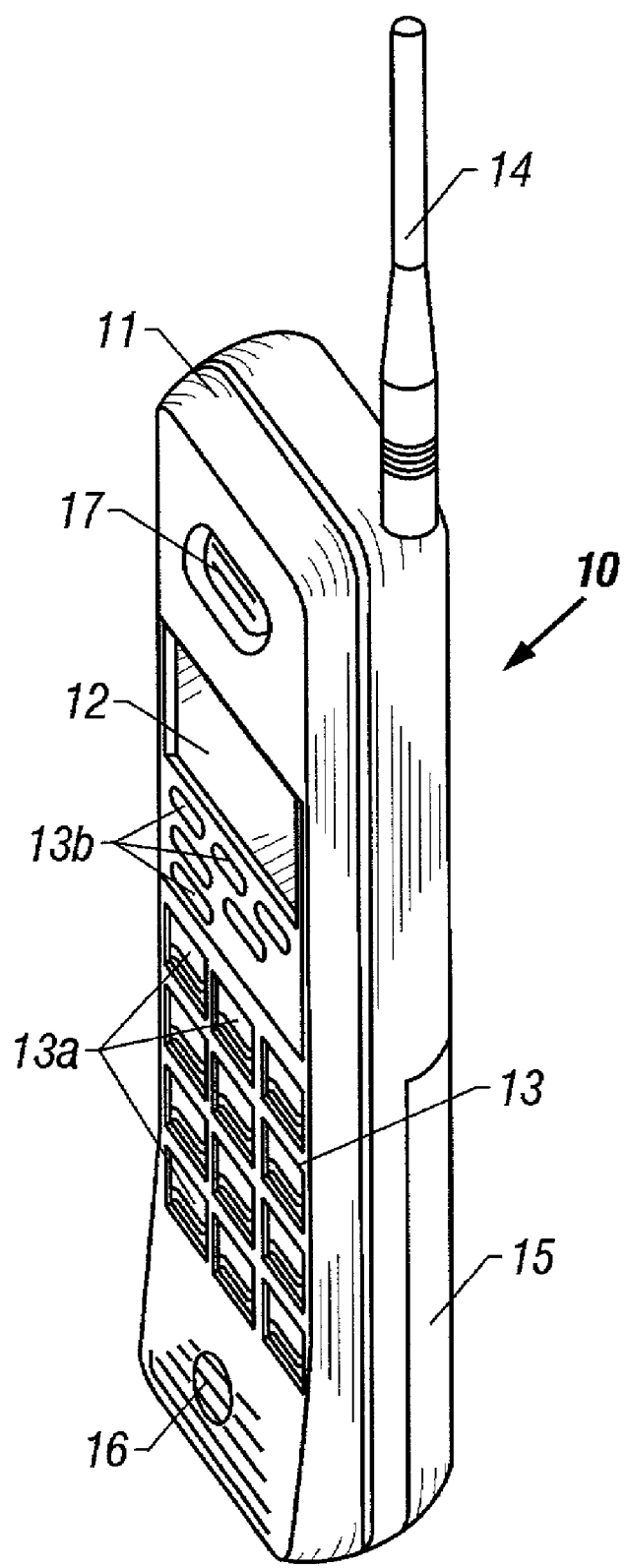
FIG. 1 is an example of a mobile telephone suitable for use in accordance with the present invention.

FIG. 1 is an illustration of a mobile telephone that may be used in the present invention. While much of the following description is directed to mobile telephones in communication with an on-board computer in an automobile, the invention lends itself equally to other devices, such as handheld personal computers, personal organizers, palmtop computers, computerized notepads, global positioning systems (GPS), electronic video games, video players, personal digital assistants, pagers or the like.

The mobile telephone 10 has a casing 11, an LCD (liquid crystal display) 12 and an antenna 14 for transmitting signals to and from a mobile telephone network. These signals include audio streams and computer readable files or instructions, such as, for example, e-mail through a service provider. A traditional speaker 17, microphone 16 and input device 13 are included as well as a power supply 15, which is normally implemented as one or more batteries. The power supply 15 might further include an external power source that overrides or recharges the built-in batteries, such as an AC adapter. The input device, typically a keypad 13, includes keys 13a, which are numeric and alphanumeric keys typically found on a telephone, and other function keys 13b, used for operating the mobile telephone including, but not limited to, a power key, a SEND key, and various menu scrolling and function keys. Wireless communications with the on-board computer utilize a dedicated internal or external transceiver as discussed in FIG. 2.

Figure 2:
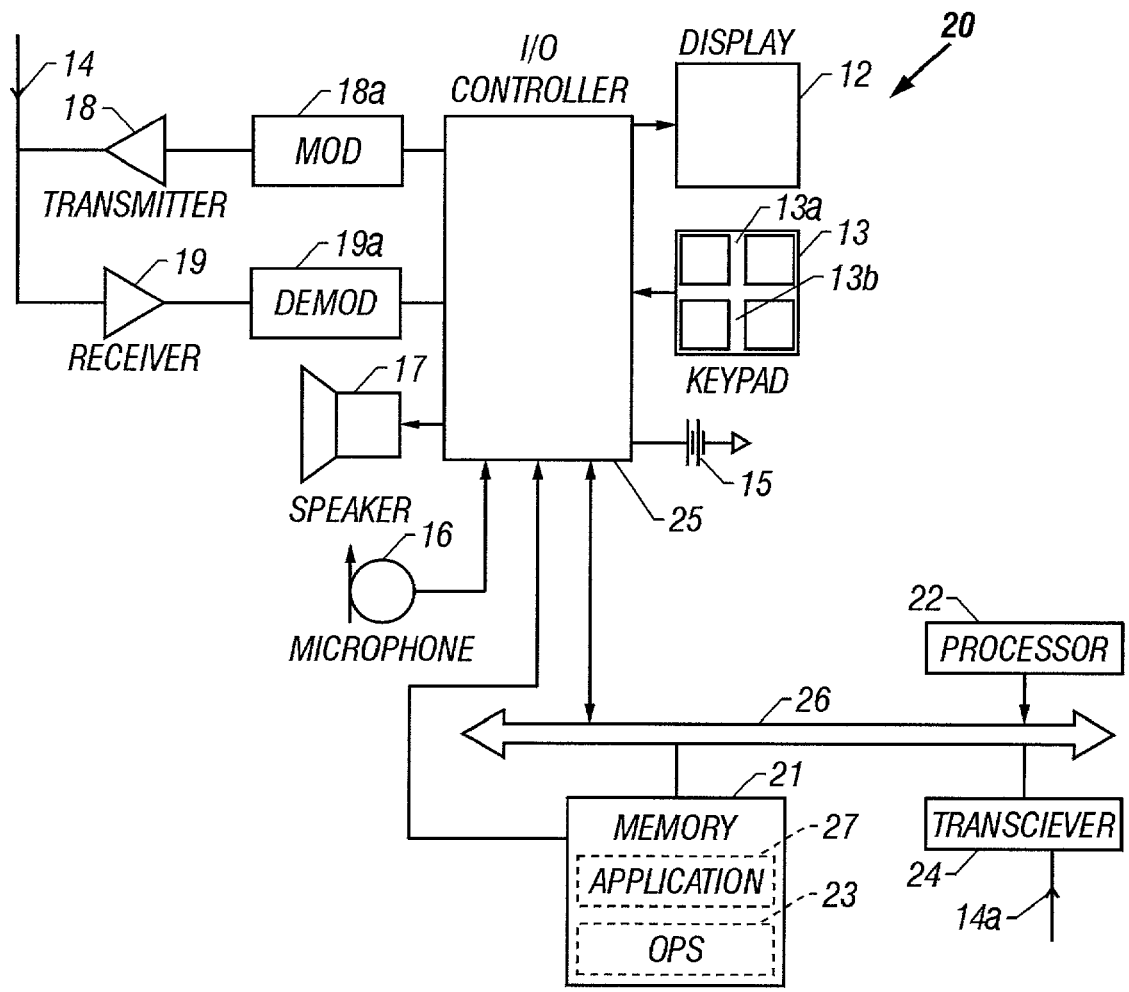
FIG. 2 is a schematic diagram of a mobile telephone suitable for use in accordance with the present invention.

FIG. 2 is a block diagram showing the functional components of the mobile telephone 20. The microphone 16, speaker 17, display 12, keypad 13 and power supply 15 are connected to the I/O controller 25. Also included are an antenna 14, a transmitter 18, a modulator 18a, a demodulator 19a and a receiver 19. These devices receive and transmit signals to and from the mobile telephone network through the antenna. The I/O controller 25 controls the transfer of data and signals to and from the input and output devices of the mobile telephone, such as the keypad 13, display 12, speaker 17 and microphone 16. The bus 26 provides communication between the processor 22, the I/O controller 25 and memory 21. The memory 21 stores the values of various mobile system parameters and the number assignment module (NAM). It also stores application programs 27 and the operating system program 23 that includes instructions to the mobile telephone's components for the operation of the mobile telephone. These programs are executed on the processor 22. A transceiver 24 is connected through an I/O controller 28 to the bus for communicating with the on-board computer. The mobile telephone can be implemented with a transceiver 24 that is an IR (infrared) transceiver and/or an RF (radio frequency) transceiver coupled to its own antenna 14a, or alternatively, the transceiver may be coupled to the mobile telephone's antenna 14.

Furthermore, it should be recognized that the vehicle may have its own built-in telephone, such that the on-board computer may control the operation of both the built-in telephone and the mobile telephone entering the vehicle. Separate identification or addresses may be used to achieve separate communications with the two telephones. Accordingly, the on-board computer may restrict use or disable features of both telephone in the same manner or in different manners, preferably on the basis of the relative safety of using one telephone or the other under the existing conditions.

Figure 3:
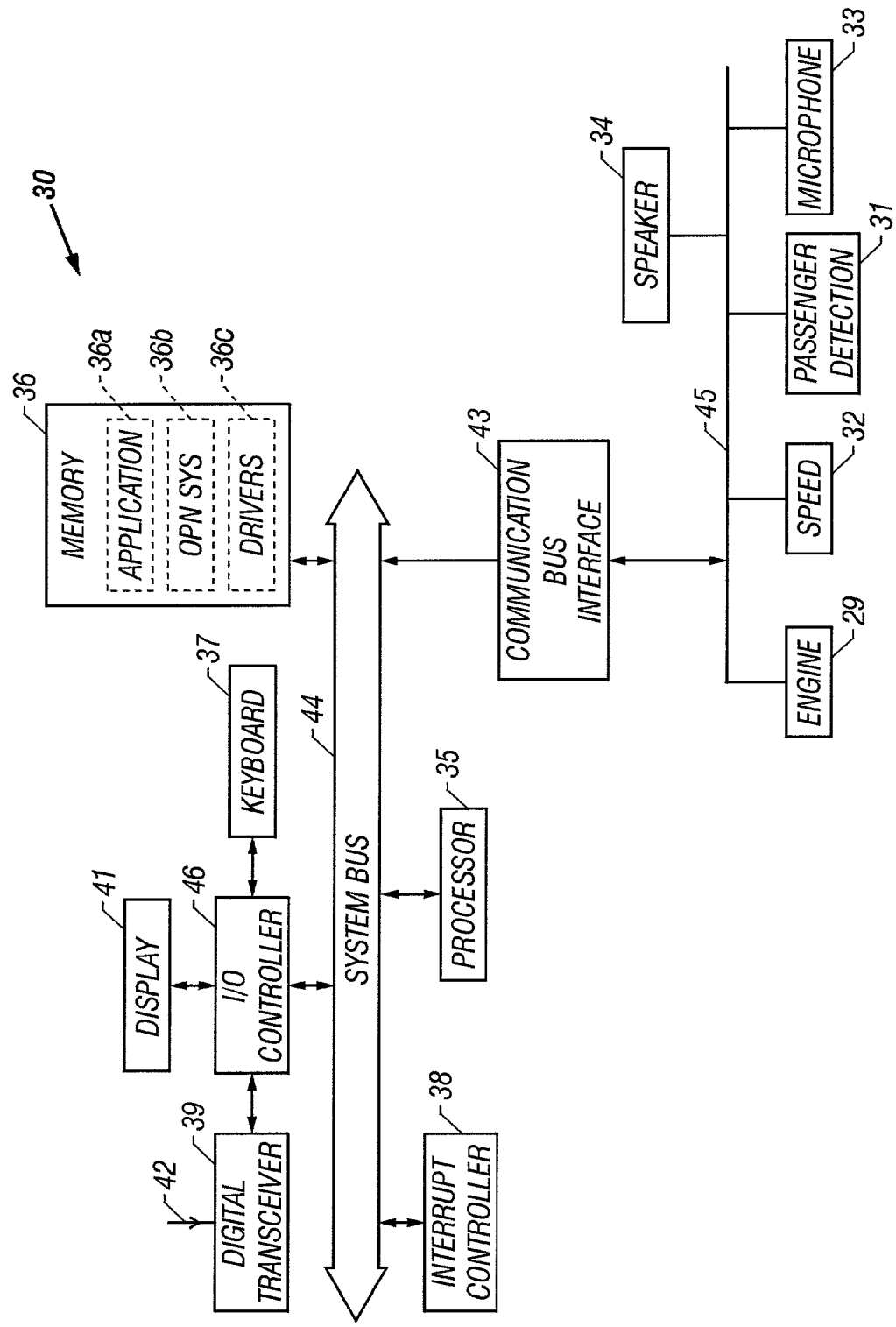
FIG. 3 is a schematic diagram of a first embodiment of a computer capable of communicating with a wireless mobile electronic device.

FIG. 3 shows an on-board computer system 30 that is mounted in an automobile and used in accordance with the present invention. The on-board computer system 30 includes a digital transceiver 39 coupled through an I/O controller 46 to the system bus 44. The digital transceiver is also coupled to an antenna 42. The digital transceiver 39 is used for sending signals to, and receiving signals from, the mobile electronic devices, such as a mobile telephone. The on-board computer system 30 further includes a display device 41, such as a monitor, and an input device, such as a keyboard 37 or a conventional touch screen input device, not shown. The display device 41 could include an electroluminescent display, liquid crystal display or similar device. The on-board computer system further includes components typically found in a computer such as a processor 35, interrupt controller 38, an I/O controller 46 and memory 36. Other typical components not shown include switches, interface circuitry, and the like. Memory 36 may include RAM, ROM, a hard disk, a floppy disk, CD-ROM or a combination of these devices. The memory 36 also stores application software 36a, the operating system 36b and any required device drivers 36c. The application software may include, for example, voice command recognition and map display software.

The on-board computer system 30 also is coupled via the communication bus interface 43 to other components and vehicle systems that are connected to an on-board communication bus 45. For example, the engine monitoring system 29 may provide the on-board computer system 30 with data regarding engine performance such as battery voltage, oil pressure, coolant level and temperature, fuel usage and engine RPM. Other components that may be connected are a speed indicator 32, a passenger detection device 31, a microphone 33 and a speaker 34. The passenger detection device 31 may be as simple as a switch in the passenger seat that would close with the weight of a passenger sitting in the seat. Alternatively, the passenger detection device could be one that uses focused IR detection to sense a passenger's presence by the passenger's body temperature, with or without the switch in the passenger seat.

Figure 4:
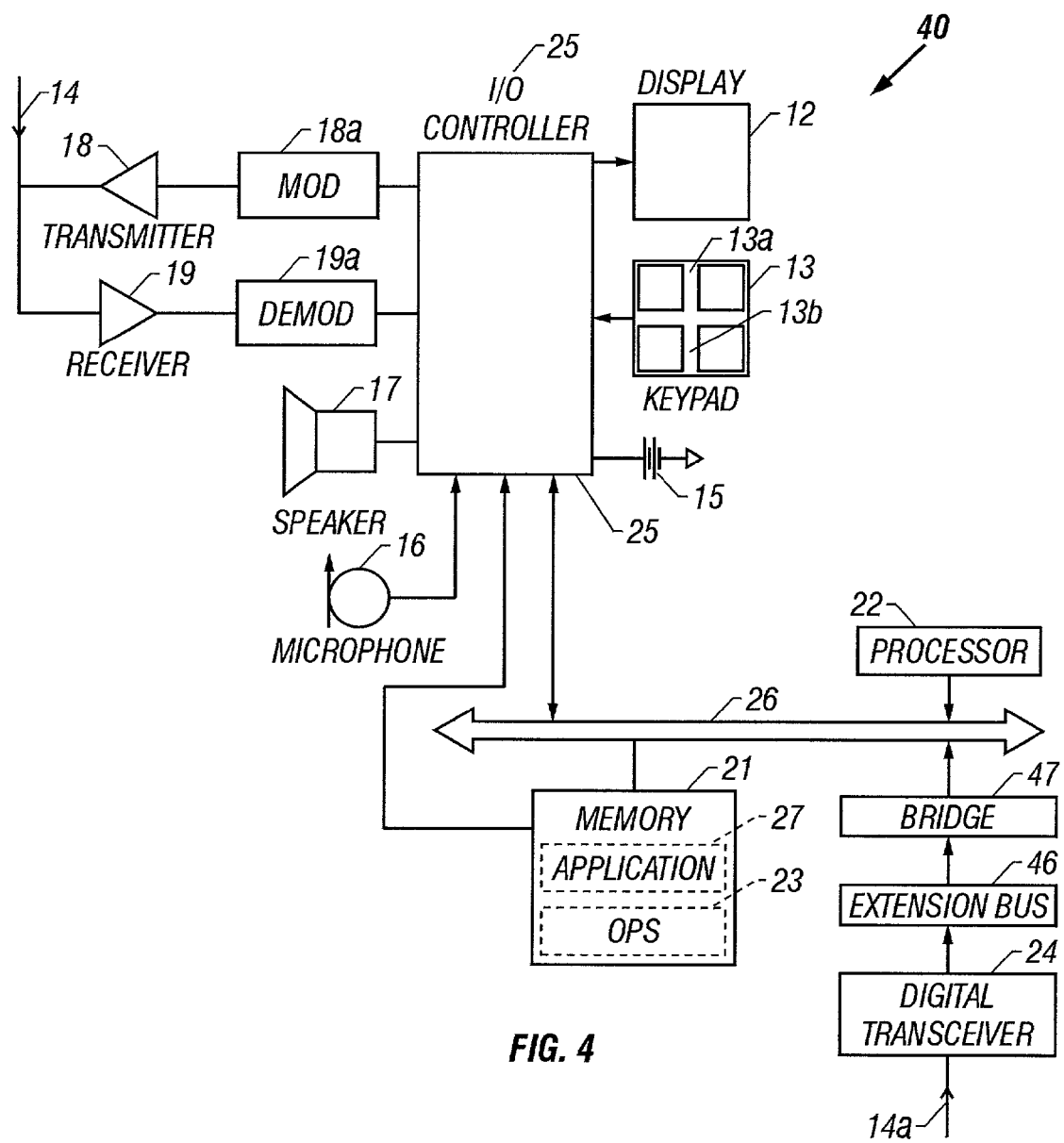
FIG. 4 is a schematic diagram of a second embodiment of a mobile telephone having an expansion bus in communication with a wireless transceiver capable of communicating with a wireless mobile electronic device.

FIG. 4 shows an alternative mobile telephone 40 that maybe used in the present invention having a different transceiver than that shown in FIG. 2. The mobile telephone 40 is substantially similar to the mobile telephone 20 shown in FIG. 2, except that the digital transceiver 24 communicates through the I/O controller 28 to an expansion bus 46, such as a USB or PCI bus, that is in turn in communication with the system bus 26 through a bridge 47 rather than communicating directly with the system bus 26. By communicating with the expansion bus 46, the digital transceiver 24 may take the form of a conventional adapter card. Adapter cards having a wireless transceiver are commercially available and can be installed in a matter of minutes. Therefore, this embodiment of the invention allows easier retrofitting of existing mobile telephones or other wireless devices.

Figure 5A:
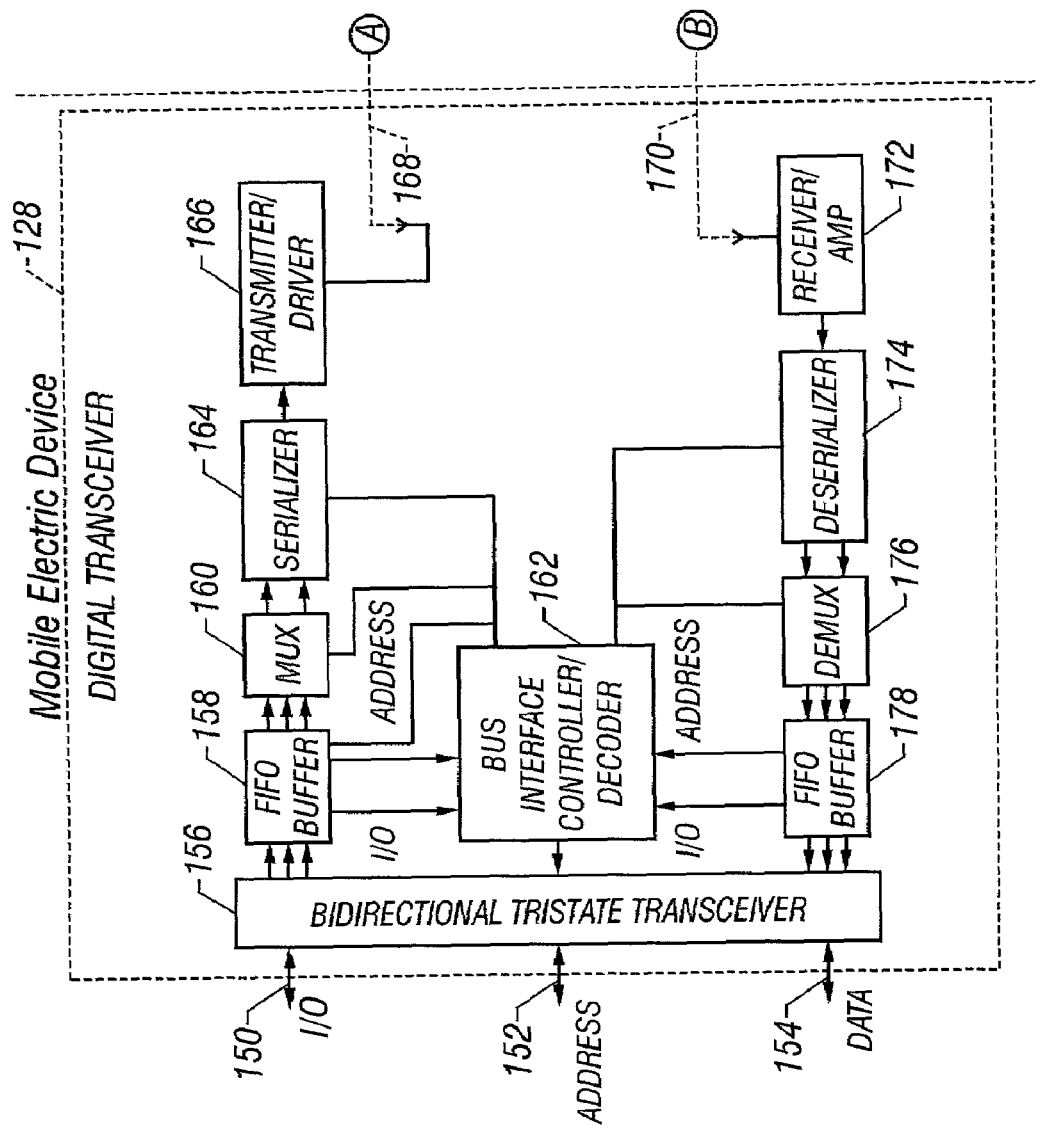
FIGS. 5A and 5B provide a schematic diagram of the digital transceivers in both an on-board computer and a wireless mobile electronic device.
Figure 5B:
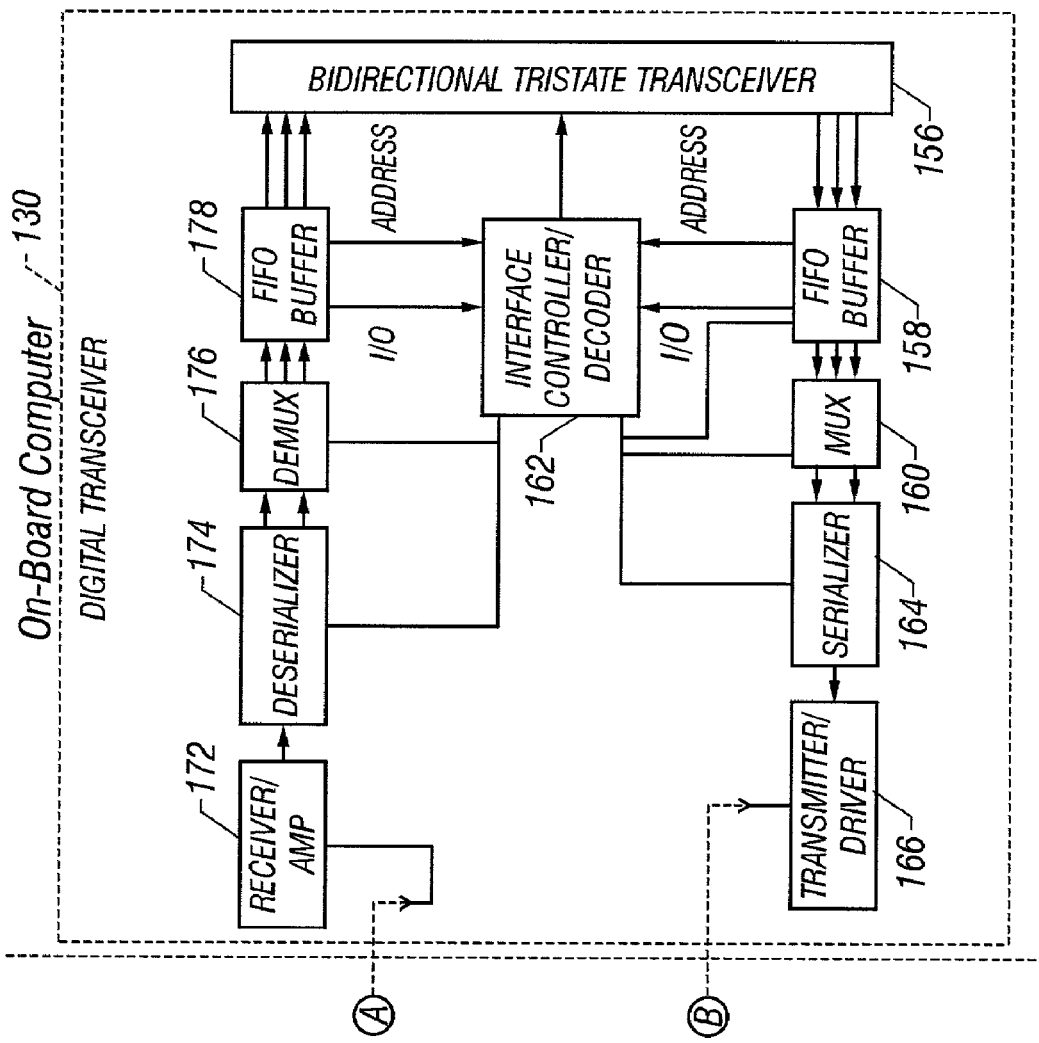

FIGS. 5A and 5B provide a schematic diagram of the digital transceiver 128 from the mobile electronic device, such as a mobile telephone, and the digital transceiver 130 from the on-board computer. The digital transceivers 128, 130 are shown as identical in structure and operation to provide a wireless communication link between the mobile electronic device and the on-board computer. Because of the similarity, FIGS. 5A and 5B use the same reference number for like parts and the following description applies equally to both figures. The operation and use of the digital transceivers is described in U.S. Pat. No. 5,877,882, which patent is hereby incorporated by reference herein. It can be seen from the figures that the input/output 150, address locations 152 and data 154 are carried from the expansion bus 46 (See FIG. 4) to and from the transceiver 156. Information coming from the expansion bus passes through the transceiver 156 and then goes to the FIFO buffer 158. The FIFO buffer 158 transmits data 154 to the multiplexer 160. The FIFO buffer 158 transmits address 152 and input/output 150 to the bus interface controller/decoder 162. The bus interface controller/decoder directs information then to the multiplexer 160, to the serializer 164, or back to the FIFO buffer 158. The multiplexer 160 directs information to the serializer 164. The serializer 164 then sends information to the transmitter driver 166 which then goes out as a wireless transmission 168, such as radio frequency waves or infrared light.

Incoming wireless transmissions 170 enter a receiver amplifier 172 and are deserialized in the deserializer 174. The deserializer 174 then sends information to the demultiplexer 176. Information goes from the demultiplexer 176 to the FIFO buffer 178 for distribution either to the bus interface controller/decoder 162 of to the transceiver 156. The bus interface controller/decoder 162 sends information to the deserializer 174, the demultiplexer 176, or to the transceiver 156. The transceiver 156 then sends received information to the bus. It should be noted that while the system of FIGS. 5A and 5B could be implemented as software, rather than hardware, the performance might be slower.

The architecture shown in FIGS. 5A and 5B permits clock variations between the on-board computer and the mobile electronic device, thereby simplifying the communication, making the system more fault-tolerant, and allowing two devices to interface despite transmitting/receiving at different speeds. Connection of devices made by different manufacturers is easily achievable since any device that conforms to the wireless link requirements can communicate with the computer. The digital transceiver also negates the need for physical, multi-pin connectors between the mobile electronic device and the on-board computer.

It should be recognized that the digital transceivers 128, 130 operate in like fashion with the transmitter of one sending signals to the receiver of the other. It should also be recognized that the digital transceivers 128, 130 operate as described above, whether they are contained in mobile device or the on-board computer.

FIGS. 6A and 6B is a flow chart illustrating the flow of data between the mobile electronic device 122 and the on-board computer 120 over both a serial communication channel 180 (shown in FIG. 6A) and a parallel communication channel 182 (shown in FIG. 6B). As shown in FIG. 6A, the PCI-Card transceiver 128 provides a serial communication channel 180 uses a single radio frequency at any one time to communicate. While use of a single frequency requires only a single transceiver, it is necessary to deserialize all communications. In order to communicate more information at a given instant, parallel communication channels are needed. As shown in FIG. 6B, an 8-bit parallel communication channel may be implemented using the transceiver 128 having 8 transceivers that are set to transmit and receive signals at 8 different frequencies. Optionally, the 8 channels may be supplemented by a transceiver dedicated to a discovery channel or one of the eight channels may serve both as a discovery channel and as a communication channel.

Figure 7:
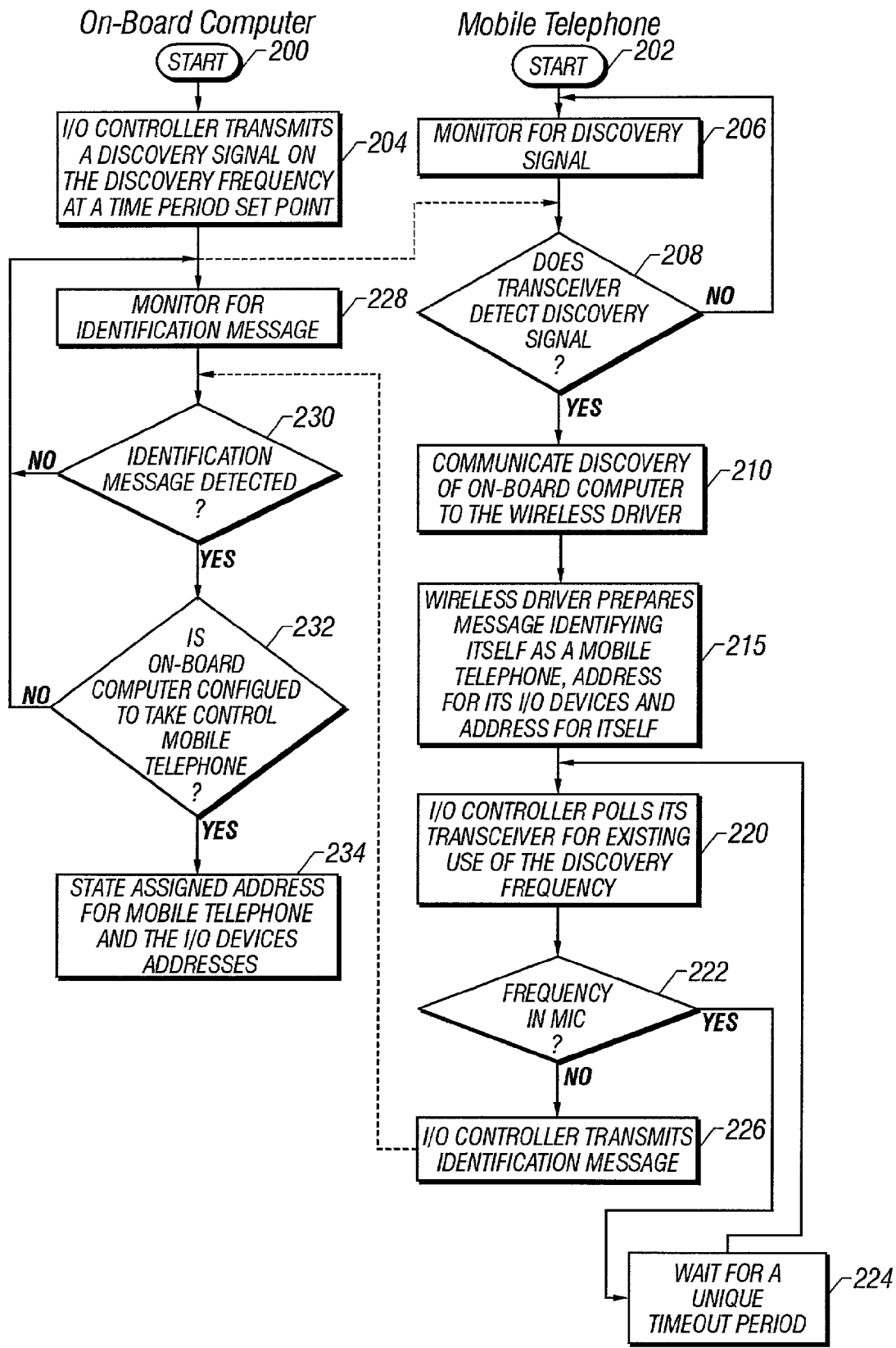
FIG. 7 provides a flowchart for the device discovery process by the on-board computer.

FIG. 7 is a flow diagram of an exemplary discovery process carried out between an on-board computer and a mobile electronic device. While the example discussed in FIG. 7 is directed to a discovery process of a mobile telephone, the discovery process is applicable to a wide range of mobile electronic devices. On-board computer 30 is equipped with a wireless transceiver 39 (as in FIG. 3), and the mobile telephone 20 are both turned on in steps 200 and 202. In state 204, the I/O controller in the on-board computer periodically transmits a discovery signal on a discovery frequency. Preferably, the discovery frequency is a standard assigned frequency for mobile electronic devices to discover an Electronic Device Control System device such as the on-board computer. Alternatively, the discovery frequency may be any frequency assigned to the mobile electronic device. Preferably, the discovery signal also contains an identification request for any mobile electronic device that receives the signal to identify itself to the on-board computer, to provide addresses for features contained within the mobile electronic device, and to provide an address for the mobile electronic device itself. The features within the mobile electronic device may include, for example, a keypad, display, speaker, microphone, transceiver, joystick, memory, transmitter, receiver, or any mobile device or component that can be addressed and managed by the on-board computer. Alternatively, the on-board computer may communicate the identification request after communications between the on-board computer and the mobile electronic device were established. This alternative would be required if the mobile electronic device was, alternatively, transmitting the discovery signal.

The mobile telephone, in state 206, monitors the discovery frequency for the discovery signal. If, in state 208, the mobile telephone's transceiver does not detect the discovery signal, then the mobile telephone continues to monitor for the discovery signal in state 206. If, in state 208, the transceiver does detect the discovery signal, then in state 210, the transceiver communicates the discovery of the on-board computer to a wireless transceiver driver in the mobile phone. In state 215, the wireless transceiver prepares a message to the on-board computer identifying itself as a mobile telephone and further providing addresses for the mobile telephone and its features, including its I/O devices that can be managed remotely. The address for the mobile telephone could be pre-assigned or it could be an address randomly generated at the time the message is prepared. A randomly generated address would better ensure that there is no duplication with an address of another mobile electronic device within the automobile. This allows for multiple devices to be controlled by an onboard computer.

States 220 through 224 are the steps of a polling method carried out by the mobile telephone. In state 220, the I/O controller polls its transceiver for existing use of the discovery frequency and, in state 222, the I/O controller determines whether the discovery frequency is already being used. If the discovery frequency is currently being used, then in state 224, the I/O controller waits for a unique timeout period before polling the discovery frequency again. Preferably the unique random timeout period is assigned to the mobile telephone in a manner that maximizes the discovery frequency's availability by preventing the mobile telephone from repeatedly polling at the exact same time and interval as another mobile electronic device is transmitting its identification signal or the on-board computer is transmitting the discovery signal at the same frequency. If the discovery frequency is not currently being used, then in state 226, the mobile telephone transmits the identification message on the discovery frequency. As in state 204, each Electronic Device Control System (EDCS) will transmit a discovery signal on the same discovery frequency in order to allow detection of the EDCS by the mobile electronic device. Alternatively, it is possible to establish different frequencies that are to be used with different EDCS's, such that when the mobile electronic device detects a discovery signal transmitting at a given frequency, that frequency will indicate to the mobile electronic device what type of EDCS is there, i.e., as in this example, an on-board computer in an automobile. Furthermore, while it is possible to establish a system in which the mobile electronic device transmits a discovery signal to the on-board computer, the preferred method is for the EDCS to transmit the discovery signal from the on-board computer as set out in states 204–210 since this conserves the use of the mobile electronic device's processor for other tasks and also minimizes the power usage that must be supplied by the battery to the mobile electronic device.

In state 228, the on-board computer monitors its discovery frequency transceiver for identification messages from mobile electronic devices inside the automobile. If no identification message is detected in state 230, then the process returns to state 228 for further monitoring. If, in state 230, the transceiver detects an identification message from the mobile telephone, then in state 232, the on-board computer determines whether it is configured to take control of the mobile telephone. If, in state 232, the on-board computer determines that it is not configured to take control of certain features of the mobile telephone, then the on-board computer returns to state 228, monitoring for identification messages. If, in state 232, the on-board computer determines that it is configured to take control of certain features of the mobile telephone, then in state 234, the on-board computer stores the address for the mobile telephone and the addresses for the mobile telephone's I/O devices and features that were contained in the identification message. The mobile telephone uses its address to identify its messages received from the on-board computer as opposed to other messages transmitted by the on-board computer destined for other mobile electronic devices inside the automobile. The on-board computer also uses the address to identify any messages transmitted by the mobile telephone. This concludes what may be considered to be the discovery process, since both the on-board computer and the mobile telephone know that the other exists and how to communicate with each other.

Figure 8A:
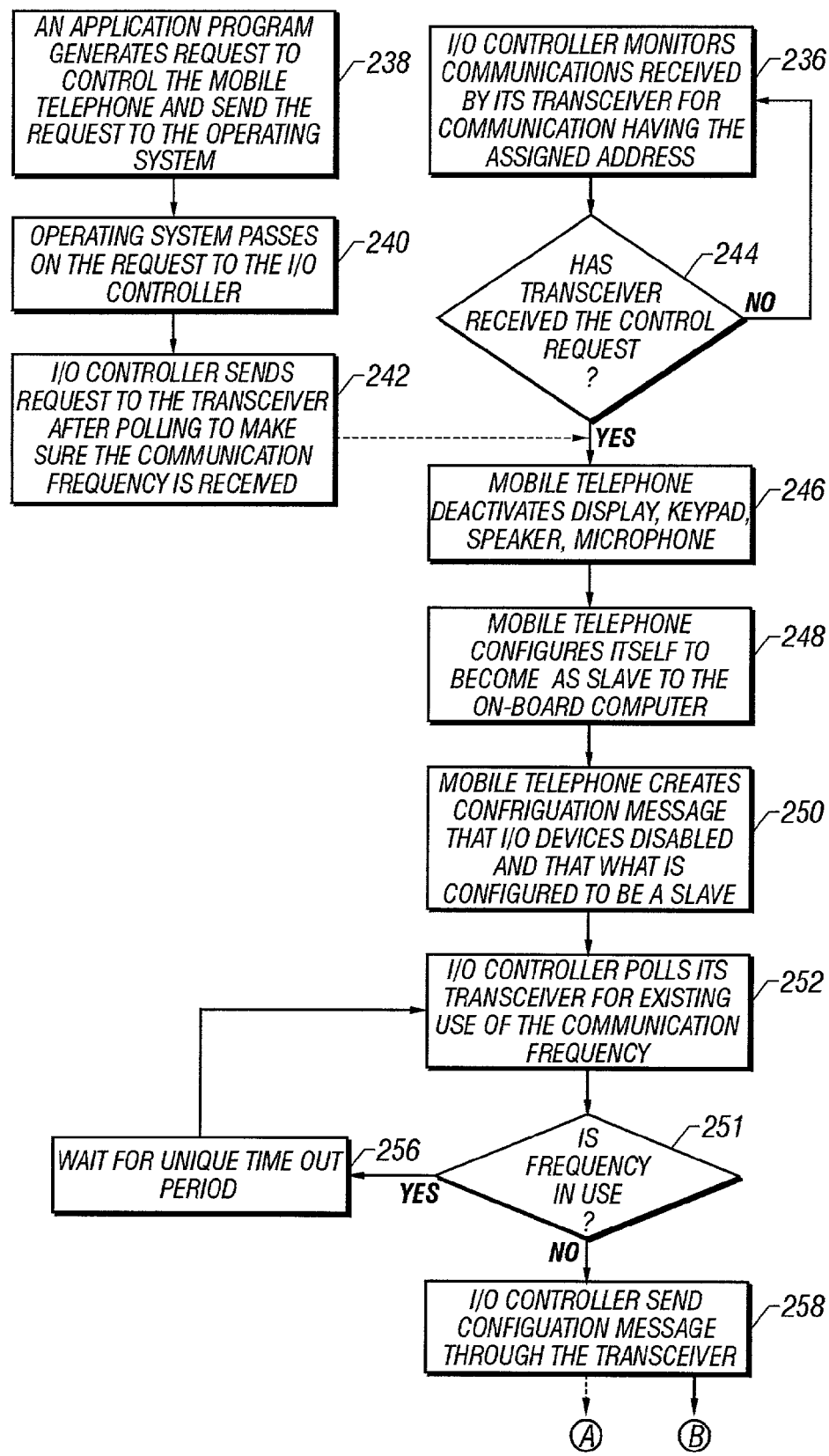
FIGS. 8A and 8B provide a flowchart for the device communication process between the device and the on-board computer.
Figure 8B:
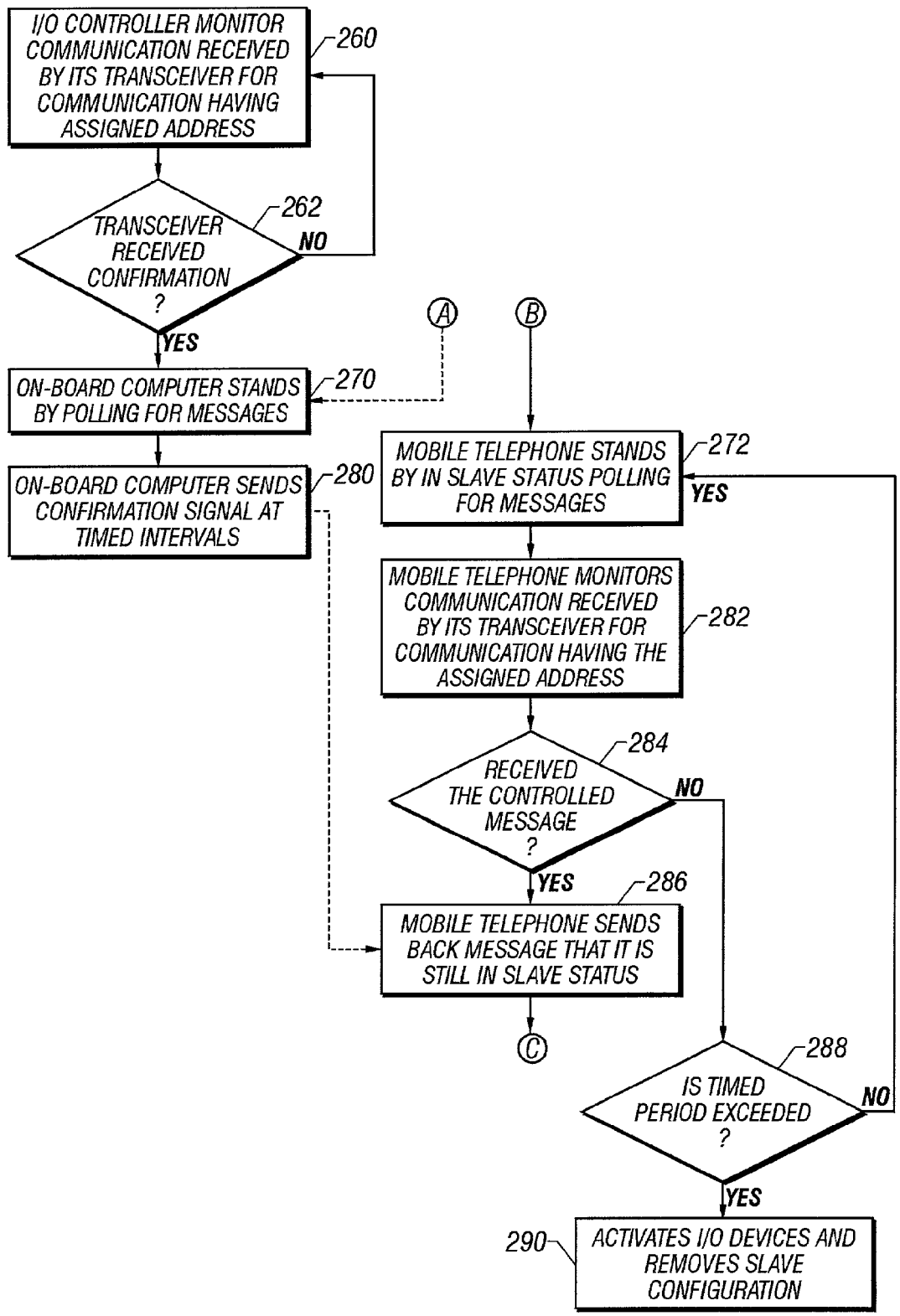

FIGS. 8A–B are a flow diagram of an exemplary communication process carried out between the on-board computer and the mobile electronic device, such as a mobile telephone, after the discovery process outlined in FIG. 7. While the example discussed in FIGS. 8A–B is directed to communication with a mobile telephone, the communications process is applicable to a wide range of mobile electronic devices, examples of which were listed previously. This communication process may also be used for all communications between the mobile electronic devices and the on-board computer, including the methods set out in FIGS. 10–12. In state 236, the I/O controller of the mobile telephone monitors communications received by its transceiver for communications having the assigned address. In state 238, an application program being executed by the on-board computer generates a request to take control of certain features of the mobile telephone and sends the request to the operating on-board computer's system. In turn, according to state 240, the operating system passes the request to the I/O controller of the computer. After polling to determine that the communications frequency is not in use, the I/O controller sends the request to the transceiver for transmitting to the mobile telephone in state 242.

In state 244, the mobile telephone determines whether its transceiver has received a control request with the assigned address. If no control request with the assigned address has been received, then the I/O controller continues to monitor communications in accordance with state 236. If an I/O control request has been received with the assigned address, then in state 246, the control request is passed from the transceiver to the device drivers and applications and the control request is processed resulting in the deactivation of the mobile telephone's certain features, such as a speaker, microphone, display, keypad or combinations thereof. In state 248, the mobile telephone processes the control request, to configure itself and relinquish control of certain I/O devices or features to the master on-board computer. As a slave device, the mobile telephone's device drivers, applications, and processor will respond to commands from the master on-board computer's processor that is running the mobile telephone application program. It is possible for on-board computer to command the mobile telephone because the processor and I/O controller of the mobile telephone are now in communication through the wireless transceiver to the processor and I/O controller of the on-board computer. In state 248, the master on-board computer only permits communication between the motorist and the functions of the mobile electronic device through the input/output devices of the on-board computer. In state 250, the mobile telephone creates a confirmation message that the mobile telephone I/O devices are disabled and that the mobile telephone is configured as a slave. In states 252–256, the mobile telephone uses a polling procedure, similar to that in FIG. 7, to determine that the communications frequency is in use. In state 252, the I/O controller of the phone polls its transceiver for existing use of the communications frequency. If, in state 254, the communications frequency is in use, then in state 256, the I/O controller waits for a unique time out period before returning to state 252. If, in state 254, the communications frequency is not in use, then in state 258, the I/O controller sends the confirmation message through the transceiver to the on-board computer. Meanwhile, in state 260, the on-board computer's I/O controller is monitoring the communications frequency for messages received by its transceiver. If, in state 262, no messages have been received from the mobile telephone, then the on-board computer continues to monitor for messages in state 260. If, in state 262, the transceiver has received the confirmation, then in state 270, the on-board computer stands by as the master polling for messages from the mobile telephone or waiting for instructions from the motorist to place a mobile telephone call. In state 272, the mobile telephone stands by in slave status polling for messages from the on-board computer and monitoring the mobile telephone system for an outside call directed to the mobile telephone.

Otherwise, the mobile telephone will reconfigure itself to the mobile telephone's normal status and activate its features, such as the keypad, display, microphone and speaker. This ensures that the mobile telephone is ready for use when the on-board computer is no longer available for controlling the mobile telephone when, for example, the automobile on-board computer is turned off. In state 280, the on-board computer periodically sends a confirmation message perhaps on the discovery frequency, to the mobile telephone at preset timed intervals to assure the mobile telephone that the mobile telephone should remain in slave status. In state 282, the mobile telephone continues to monitor the communications received by its transceiver from the on-board computer for messages having the assigned address. If, in state 284, the confirmation message has been received, then in state 286, the mobile telephone returns a message confirming that the mobile telephone remains in slave status and the method continues to state 272. If, in state 284 the confirmation message is not received, then in state 288, the mobile telephone determines whether a timeout interval has elapsed. If, in state 288, the timeout interval has not elapsed, then the mobile telephone remains in slave status as in state 272. If, in state 288, the timeout interval has elapsed, then in state 290, the mobile telephone reactivates its I/O devices and removes the slave configuration so that the mobile telephone is returned to normal status.

It is important to note that the mobile electronic device identification and addressing process described herein allows for the mobile telephone to discover, address and utilize the on-board computer and, optionally, other electronic devices. Accordingly, the on-board computer can control a mobile telephone, PDA, notebook computer, and the like, and configure and control each device simultaneously. If the transceivers of each device communicate at the same frequency, however, then the on-board computer can communicate with only one device at a time. Even so, by periodically changing the address portion of the transmission from the address of one mobile electronic device to the address of one or more other mobile electronic devices, it is possible to achieve communications that appear to be simultaneously controlling multiple devices.

In order to achieve true multi-channel communications with multiple mobile electronic devices, each of the transceivers 128, 130, such as the 8 transceivers facilitating the 8-bit communication of FIG. 6B, must transmit at a different frequency. Upon discovery of a mobile electronic device, the mobile electronic device is assigned to a particular transmission frequency rather than being assigned an address. In this manner, any transmission at the assigned frequency is essentially a direct communication with the mobile electronic device and each component of the mobile device will have its own unique address.

It is an optional feature of the present invention to allow a central control computer operator, someone authorized to instigate limitations over the use of mobile electronic devices within a facility, to set up certain preferences about how the central control computer, here the on-board computer, will operate. It is anticipated that the operator may desire to establish a preference that would always automatically accept the mobile telephone or other mobile electronic devices, as in state 232 of FIG. 7, as soon as the identification message from the mobile electronics device is received by on-board computer's transceiver. Another advantageous preference would be to limit the types of mobile electronic devices that operator wants to accept or the features of the mobile device that the on-board computer may take control over. For example, the operator may prefer to automatically accept a mobile telephone and a digital camera, but not a computer game or a personal digital assistant. Other and further preferences are within the scope of the present invention.

Figure 9:
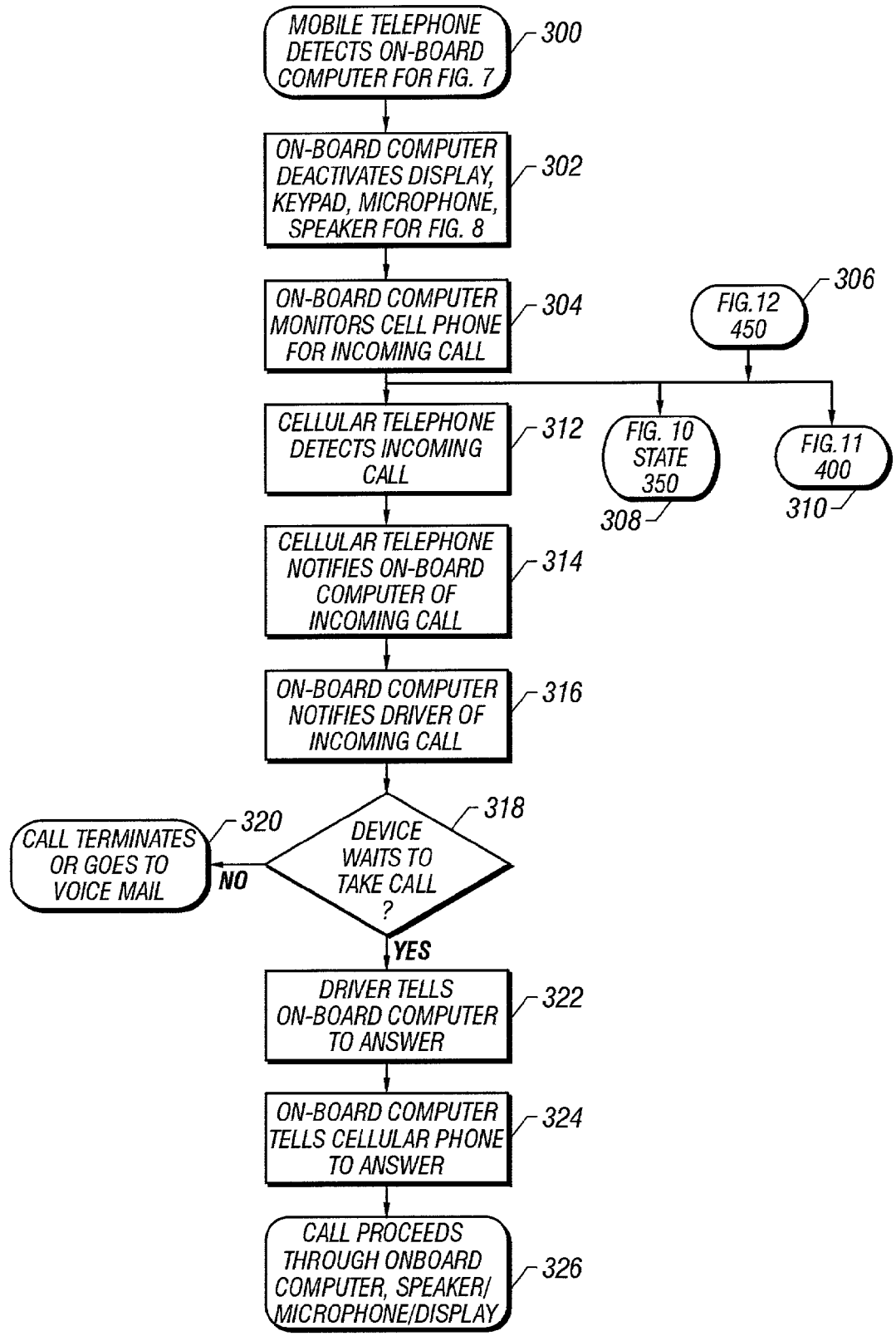
FIG. 9 is a flow chart of a method for receiving a mobile telephone call in an automobile.

FIG. 9 is a flow diagram of an exemplary method for receiving a mobile telephone call in an automobile. In state 300, the mobile telephone detects the on-board computer by the discovery method of FIG. 7. In state 302, the communications method of FIGS. 8A and 8B is implemented and the on-board computer instructs the mobile telephone to deactivate the mobile telephone's keypad, display, microphone and speaker by the method shown in FIGS. 8A–B. In state 304, the on-board computer monitors the mobile phone for an incoming telephone call. In state 312, the mobile telephone detects an incoming call and, in state 314, notifies the on-board computer of the incoming call. In state 316, the on-board computer notifies the motorist of the incoming call. The notification to the motorist may be by audio means, visual means, a combination of these, or any other suitable output means available to the on-board computer. In state 318, the motorist indicates whether to take the telephone call. The indication may be by voice command or by depressing a button on the on-board computer panel or a combination of these or by any other suitable input means available for communicating with the on-board computer. If, in state 318, the motorist indicates no desire to accept the call, then in state 320, the telephone call will automatically roll over to voice mail or otherwise terminate. If, in state 318, the motorist indicates the decision to accept the telephone call, then the driver tells the on-board computer to answer in state 322 and the on-board computer will instruct the mobile telephone to receive the telephone call in state 224. By accepting the signal received on its antenna or the automobile's antenna and retransmitting the signal or a similar signal to the on-board computer via the transceiver. Alternatively, the mobile telephone may allow simultaneous use of the antenna by both the receiver and the transceiver. In state 326, the telephone call proceeds through the on-board computer's speaker, microphone, and display with the mobile telephone acting as a slave to the on-board computer's mobile telephone application program. The mobile telephone transmits the signals to the on-board computer and includes in each signal the address of the mobile telephone, to identify the source of the message, and an indicator or address of the I/O device of the on-board computer to be used by the signal. For example, if the signal was an audio signal intended for the speakers, by identifying the speaker address, the on-board computer can determine, by comparing the address sent by the signal with the addresses sent in the identification message, to play the signal over the automobile's speakers. Additionally, when the on-board computer sends a signal to the mobile telephone, the on-board computer addresses the signal to the mobile telephone and also includes the address of the I/O device. The mobile telephone can then treat the signal as though the I/O device having that address in the mobile telephone had generated the signal. For example, if the signal were from a microphone in the automobile, by identifying the microphone address for the mobile telephone, the mobile telephone can determine to treat the signal as though the microphone of the mobile telephone generated the signal. States 306, 308 and 310 are branches to methods shown in FIGS. 10–12 discussed in more detail below.

Figure 10:
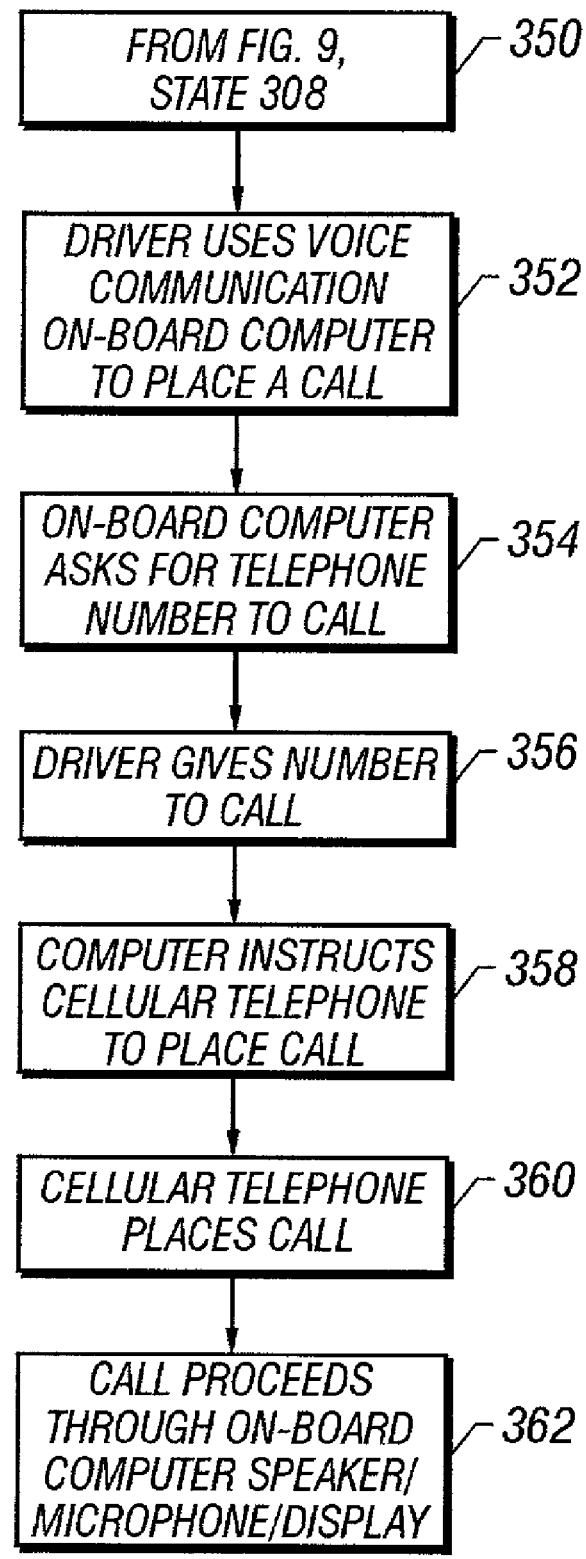
FIG. 10 is a flow chart of a method for placing a mobile telephone call from an automobile.

FIG. 10 is a flow diagram of an exemplary method for placing a mobile telephone call from inside an automobile. In state 350, the method begins from state 308 of FIG. 9. In state 352, the motorist indicates a desire to place a mobile telephone call. This indication may be, for example, by voice command or by pushing a button on the on-board computer's keypad, or by keying in the telephone number to be called on the on-board computer's keyboard or a combination of these. Alternatively, the motorist may request the on-board computer to display or speak the telephone directory stored in the mobile telephone's memory. In that case, the on-board computer would order the mobile telephone to access the database containing the telephone directory in the mobile telephone's memory and send the display signal, which would normally display the directory on the mobile telephone's display, to the on-board computer which might be a heads-up display that the driver can see while driving or speak it through the automobile's speaker system. The on-board computer would then display that information on the video display of the on-board computer. In state 354, the on-board computer asks for the telephone number to call and, in state 356, the motorist designates the telephone number to call either by voice command for name or number. In state 358, the on-board computer instructs the mobile telephone to place the telephone call, through the mobile telephone's antenna or the vehicle's antenna, to the designated number. In state 360, the mobile telephone places the telephone call to the designated telephone number and in state 362, the telephone call proceeds through the on-board computer's speaker, microphone, and display.

Figure 11:
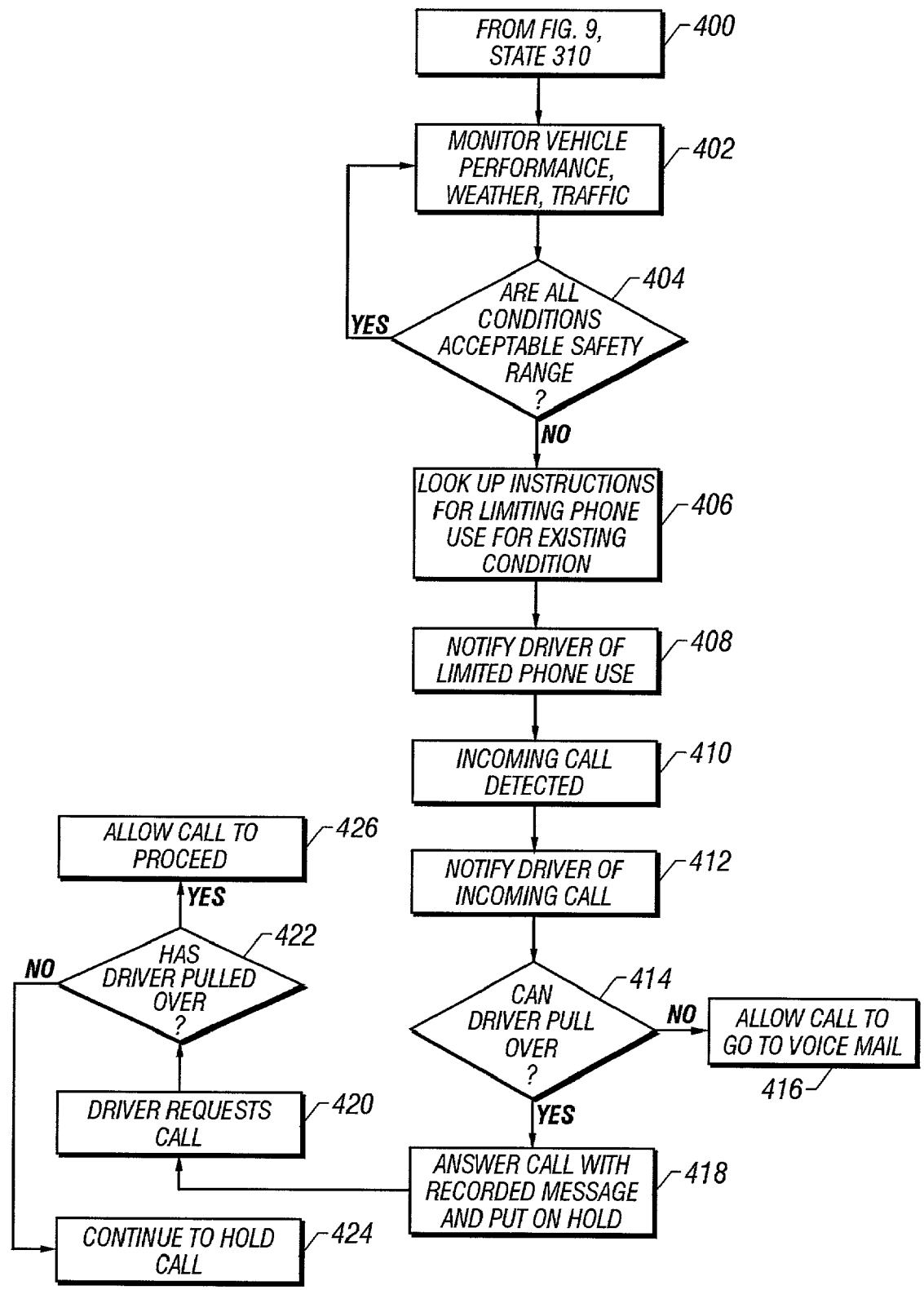
FIG. 11 is a flow chart of a method for limiting the use of a mobile telephone in an automobile.

FIG. 11 is a flow diagram of an exemplary method for limiting an automobile driver's (motorist's) use of a mobile telephone during unsafe conditions. In state 400, the method continues from state 310 of FIG. 9. In state 402, the on-board computer monitors safety parameters used to determine the allowable extent of use of a mobile telephone inside the automobile. These safety parameters may include vehicle performance, traffic conditions and weather. Some of the safety parameters may be measured conditions, such as, for example, weather outside the automobile, speed of the automobile, braking frequency, distance to other vehicles, engine RPM, engine coolant level and temperature, steering wheel movement, automobile's acceleration, frequency of automobile's acceleration, time of day, time period of driving without a rest stop and combinations thereof. Some of the safety parameters may be deduced conditions, such as, for example, traffic density, presence of a passenger, motorist fatigue and combinations thereof. Motorist fatigue may be deduced, for example, by examining the time of day, length of time the motorist has been operating the automobile without a rest stop, the jerkiness of the motion of the steering wheel, and the frequency of the automobile's acceleration and braking. Traffic density may be deduced, for example, by the number of vehicles surrounding the automobile, braking frequency, car speed, frequency of acceleration and the like. Normal or safe values for these conditions or combinations of conditions are stored in a database within the on-board computer's memory. Other values may include the vehicle location as determined by GPS or other location determining system or database. Such databases may include an accident history or propensity for an accident, as mentioned previously, that may be used to determine safe speed and other conditions.

In state 404, the on-board computer determines whether all the measured and deduced conditions are within the acceptable safety range by comparing the measured conditions to the normal conditions stored in the database. If, in state 404, all the conditions are not in the acceptable safety range, then in state 406 the on-board computer checks for the instructions to implement that limit mobile telephone use under the existing conditions. These limits may be, for example, refusal to accept a mobile telephone call, refusal to place a mobile telephone call other than for an emergency telephone call to, for example, 911, limiting the length of time for a mobile telephone call, limiting the frequency of mobile telephone calls, limiting motorist input only to voice commands, blocking output to the visual display device, and other similar limitations. The on-board computer removes these limitations when the measured and deduced conditions return to normal or when the motorist pulls the automobile over to the side of the road or otherwise stops the automobile for a present amount of time. In state 408, the computer notifies the motorist of the imposed mobile telephone constraints being implemented. In state 410, an incoming call is detected by the on-board computer. In state 412, the on-board computer notifies the motorist of the incoming call and, in state 414, the on-board computer inquires whether the motorist can pull the automobile over safely, or otherwise bring the existing conditions into the normal range. If the motorist does not respond or responds that the automobile cannot be pulled over safely, then, in state 416, the mobile telephone call is allowed to roll over to voice mail or is otherwise terminated. If, in state 414, the motorist indicates to the on-board computer that the automobile can be safely pulled over or otherwise returned to a safe operating condition, then in state 418, the on-board computer answers the mobile telephone call with a pre-recorded message informing the caller that the motorist will receive the call shortly and places the telephone call on hold. When the motorist pulls the automobile over or otherwise returns the automobile to a safe operating condition, the motorist requests that the on-board computer allow him to take the call in state 420. If, in state 422, the automobile is still not in a safe condition to receive mobile telephone calls, then in state 424, the mobile telephone call remains on hold. If, in state 422, the automobile is in a safe condition to receive the mobile telephone call, then in state 426, the telephone call is completed. The system may be programmed to enable placing emergency calls, for example to 911, regardless of the measured conditions.

Figure 12:
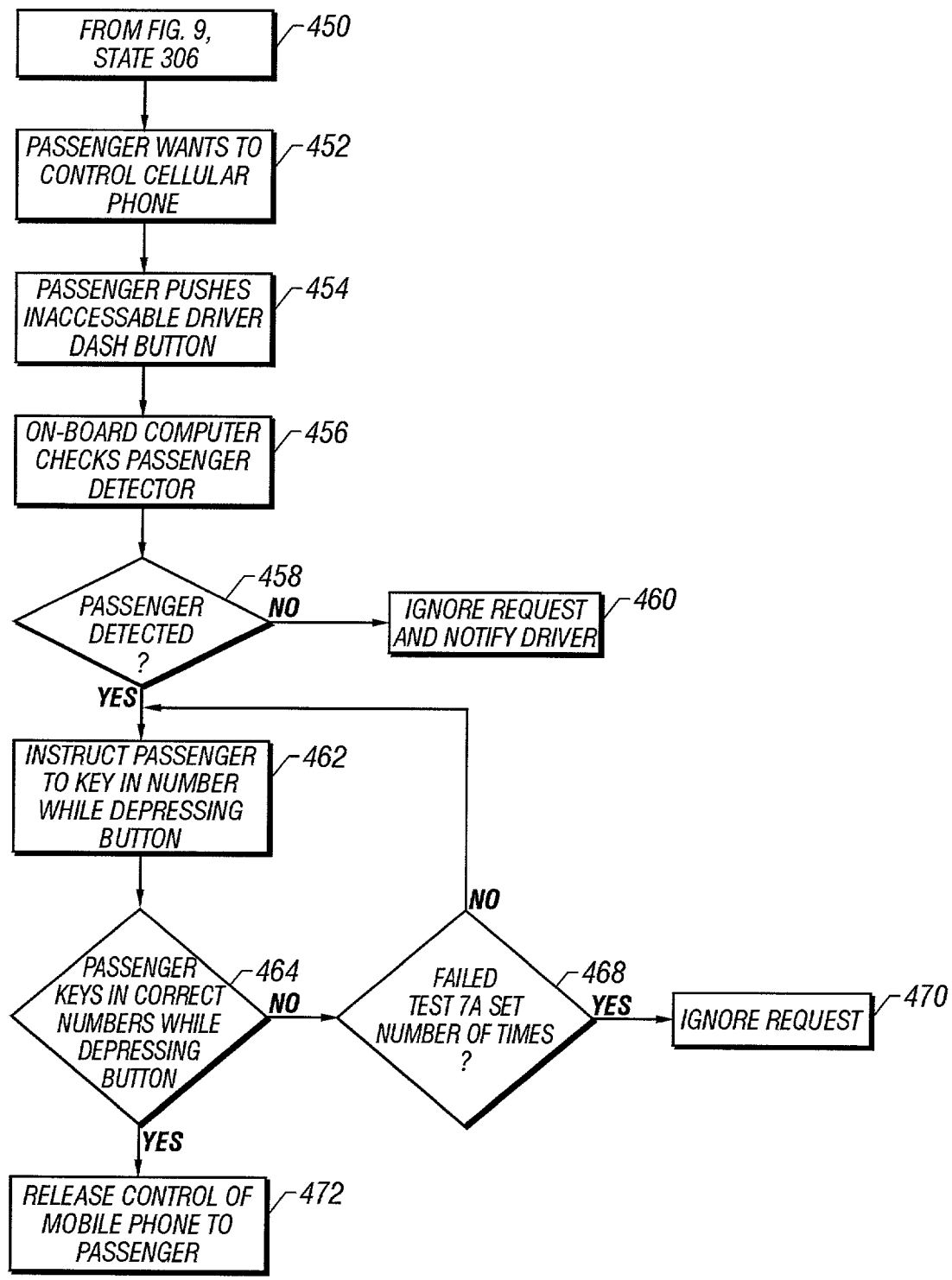
FIG. 12 is a flow chart of a method for enabling a mobile telephone to be fully utilized by a passenger.

FIG. 12 is a flow diagram of an optional method for enabling a mobile telephone to be filly utilized by a passenger in an automobile. In state 450, the method continues from state 306 of FIG. 9. In state 452, a passenger decides to fully use a mobile telephone in the automobile. In state 454, the passenger informs the on-board computer of this desire by depressing a motorist-inaccessible button or other means that enables the on-board computer to determine that the request came from a passenger. In state 452, the on-board computer checks to determine if there is a passenger in the automobile, for example, by checking a switch in the passenger seat to determine if the switch is closed by the weight of a passenger sitting in the seat. If, in state 458, no passenger is detected, then in state 460, the on-board computer ignores the request and the on-board computer notifies the motorist of the ignored request. If, in state 458, a passenger is detected, then in state 462, the on-board computer instructs the passenger to enter a series of numbers into the mobile telephone keypad while the passenger simultaneously depresses the motorist inaccessible button. Alternatively, any other method that proves the presence of a passenger would be acceptable. If, in state 464, the passenger does not key in the correct numbers while simultaneously depressing the motorist inaccessible button, then in state 468, the on-board computer determines whether the passenger has failed the test more times than a predetermined number of test attempts. If, in state 468, the number of failed attempts is less than the predetermined number of tests, then in state 462, the passenger is requested to repeat the test of state 462. If, in state 468, the passenger has failed the test more times than the predetermined acceptable number of tests, then in state 470, the on-board computer ignores the request to grant full control of the mobile telephone. If, in state 464, the passenger passes the test, then in state 472, the computer relinquishes control of the mobile telephone, the mobile telephone reconfigures itself from the slave status to normal status, and the mobile telephone can be fully used by the passenger. Furthermore, an infrared detector or other means may be used to make sure the mobile telephone stays on the passenger side of the automobile. Furthermore, it may not be necessary for the passenger to pass the foregoing test in order to allow the passenger to have full use of vehicle features.

As stated previously, the present invention allows for the on-board computer to take control of any mobile electronic device having a wireless transceiver and set up to obey wireless control signals. For example, a mobile GPS could be made a slave by the on-board computer and then, through the visual display and other I/O devices of the on-board computer, provide location information and directions to the motorist using the global positioning information of the GPS system tied into the on-board computer. The present invention frees the motorist from the distractions of operating the mobile GPS in its normal mode and allows the motorist to concentrate on driving safely. The present invention also allows the motorist to safely use a mobile GPS in the automobile instead of having to purchase a separate on-board GPS to ensure safe operation of the device while driving. Alternatively, a GPS built into the automobile can be made accessible to a mobile telephone, PDA or notebook computer to determine the location of the automobile.

It should be recognized that the advantages of the present invention may be equally applied where a mobile telephone is brought within a vehicle and connected to the vehicle in a "wired" mode. The same aspects and features of the invention, described above, maybe applied and used to disable features of the mobile telephone in this circumstance although the communications between the mobile telephone and the on-board computer may now take place through wires instead of through wireless transmissions.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

The invention claimed is:

1. A method for operating a mobile electronic device within an automobile having an on-board computer, comprising:
   transmitting a discovery signal on a discovery frequency from the on-board computer;
   receiving, at the on-board computer, a wireless identification message from the mobile electronic device located within the automobile, wherein the message contains information describing the mobile electronic device, an address for the mobile electronic device, and an address for each of one or mare features within the mobile electronic device;
   storing, within the on-board computer, the address for the mobile electronic device, and the address for each of one or more features within the mobile electronic device;
   communicating reconfiguration instructions from the on-board computer to the mobile electronic device, wherein the reconfiguration instructions instruct the mobile electronic device to reconfigure as a slave device to the on-board computer.

2. The method of claim 1, wherein the mobile electronic device is selected from a mobile telephone, a handheld personal computer, a personal organizer, a palmtop computer, a computerized notepad, a global positioning system (GPS), an electronic video game, a video player, a personal digital assistant or combinations thereof.

3. The method of claim 1, wherein the mobile electronic device comprises a wireless transceiver for transmitting and receiving wireless signals selected from radio frequency and infrared signals.

4. The method of claim 1, further comprising:
   receiving the discovery signal at the mobile electronic device; and
   interpreting the discovery signal to be an identification request from the on-board computer.

5. The method of claim 4, further comprising:
   monitoring by the mobile electronic device for messages to the address for the mobile electronic device;
   monitoring byte on-bard computer for messages from the address forte mobile electronic device.

6. The method of claim 1, wherein the one or more features within the mobile electronic device are selected from transceiver, speaker, microphone, keypad, video display,joystick, memory, transmitter, receiver, antenna or combinations thereof.

7. The method of claim 6, further comprising utilizing one or more features within the on-board computer instead of the one or more disabled features within the mobile electronic device.

8. The method of claim 7, further comprising:
   obtaining data, using the on-board computer, about the status of conditions affecting the automobile; and
   determining, using the on-board computer, which of the one or more features within the on-board computer to make available to a motorist.

9. The method of claim 8, wherein the conditions are measured conditions selected from weather outside the automobile, speed of the automobile, braking frequency, distance to other vehicles, engine RPM, engine coolant level and temperature, steering wheel movement, automobile's acceleration and braking, frequency of automobile's acceleration and braking, time of day, time period of driving without a rest stop or combinations thereof.

10. The method of claim 9, wherein the conditions are deduced conditions selected from traffic density, presence of a passenger, motorist fatigue or combinations thereof.

11. The method of claim 9, wherein the step of determining the features to make available to the motorist further comprises:
   defining a normal value for each of the conditions and combinations of the conditions;
   storing the normal value in a database of the on-board computer;
   storing instructions in the database of the on-board computer for removing availability of the features based upon a variance between the normal condition and an actual condition and combinations of actual conditions;
   determining a variance between the normal conditions and the actual conditions; and
   removing availability of the features based upon the instructions.

12. The method of claim 11, wherein the mobile electronic device is a mobile telephone and wherein the stored instructions are selected from refusal to accept a mobile telephone call, refusal to place a mobile telephone call, placing only emergency mobile telephone calls, limiting the duration of a mobile telephone call, limiting the frequency of mobile telephone calls, limiting motorist input only to voice commands, blocking output to the automobile's visual display device or combinations thereof.

13. The method of claim 8, wherein the step of obtaining data, using the on-board computer, about the status of conditions affecting the automobile, further comprises:
accessing a driving history database to obtain data about driving conditions.

14. The method of claim 13, further comprising:
determining the vehicle location using a global positioning system; and
obtaining driving conditions from the driving history database associated with the vehicle location.

15. The method of claim 14, wherein the driving conditions are selected from road hazards, accident frequency, propensity for accidents, visibility, curves, and combinations thereof.

16. The method of claim 1, further comprising:
allowing the mobile telephone to simultaneously use features of the mobile telephone and features of the automobile.

17. The method of claim 1, further comprising:
communicating instructions from the on-board computer to the mobile electronic device to disable one or more features within the mobile electronic device.

18. A system for operating a mobile electronic device within an automobile having an on-board computer, comprising:
an on-board computer comprising memory and a digital transceiver mounted in an automobile, wherein the transceiver transmits a discovery signal on a discovery frequency and receives a wireless identification message from, the mobile electronic device located within the automobile and wherein the message contains information describing the mobile electronic device, an address for the mobile electronic device, and an address for each of one or more features within the mobile electronic device;
the address for the mobile electronic device stored in the memory,
the address for each of the one or more features within the mobile electronic device stored in the memory, wherein the transceiver further transmits reconfiguration instructions to the mobile electronic device to instruct the mobile electronic device to reconfigure itself as a slave device to the on-board computer.

19. The system of claim 18, wherein the mobile electronic device is selected from a mobile telephone, a handheld personal computer, a personal organizer, a palmtop computer, a computerized notepad, a global positioning system (GPS), an electronic video game, a video player, a personal digital assistant or combinations thereof.

20. The system of claim 18, wherein the mobile electronic device comprises a wireless transceiver for transmitting and receiving wireless signals selected from radio frequency and infrared signals.

21. The system of claim 18, wherein the one or more features within the mobile electronic device are selected from transceiver, speaker, microphone, keypad, video display, joystick, memory, transmitter, receiver or combinations thereof.

22. The system of claim 21, further comprising utilizing one or more features within the on-board computer instead of the one or more disabled features within the mobile electronic device.

23. The system of claim 18, further comprising:
a database in a memory of the on-board computer containing normal values for conditions and combinations of conditions affecting the automobile and
a database of instructions for removing the availability of the features based upon a variance between the normal values and an actual condition and combinations of actual conditions, wherein the variance is determined and wherein a motorist is denied access to the one or more features based upon the instructions.

24. The system of claim 23, wherein the conditions are measured conditions selected from weather outside the automobile, speed of the automobile, braking frequency, distance to other vehicles, engine RPM, engine coolant level and temperature, steering wheel movement automobile's acceleration, frequency of automobile's acceleration, time of day, time period of driving without a rest stop or combinations thereof.

25. The system of claim 23, wherein the conditions are deduced conditions selected from traffic density, presence of a passenger, motorist fatigue or combinations thereof.

26. The system of claim 23, wherein the mobile electronic device is a mobile telephone and wherein the instructions are selected from refusal to accept a mobile telephone call, refusal to place a mobile telephone call, placing only emergency mobile telephone calls, limiting the duration of a mobile telephone call, limiting the frequency of mobile telephone calls, limiting motorist input only to voice commands, blocking output to the automobile's visual display device or combinations thereof.

27. A computer program product including instructions embodied on a computer readable medium, the instructions comprising:
transmitting instructions for transmitting a discovery signal on a discovery frequency from the on-board computer;
receiving instructions for receiving, at the on-board computer, a wireless identification message from the mobile electronic device located within the automobile, wherein the message contains information describing the mobile electronic device, an address for the mobile electronic device, and an address for each of one or more features within the mobile electronic device;
storing instructions for storing, within the on-board computer, the address for the mobile electronic device, and the address for each of one or more features within the mobile electronic device;
communicating instructions for communicating reconfiguration instructions from the on-board computer to the mobile electronic device,
wherein the reconfiguration instructions instruct the mobile electronic device to reconfigure as a slave device to the on-board computer.

28. The computer program product of claim 27, wherein the mobile electronic device is selected from a mobile telephone, a handheld personal computer, a personal organizer, a palmtop computer, a computerized notepad, a global positioning system (GPS), an electronic video game, a video player, a personal digital assistant or combinations thereof.

29. The computer program product of claim 27, wherein the mobile electronic device system comprises a wireless transceiver and for transmitting and receiving wireless signals selected from radio frequency and infrared.

30. The computer program product of claim 27, comprising:
receiving instructions for receiving the discovery signal by the mobile electronic device;

interpreting instructions for interpreting the discovery signal to be an identification request by the on-board computer.

31. The computer program product of claim 27, further comprising:
monitoring instructions for monitoring at the mobile electronic device for messages to the address for the mobile electronic device; and
monitoring instructions for monitoring at the on-board computer for messages from the assigned address for the mobile electronic device.

32. The computer program product of claim 27, wherein the one or more features within the mobile electronic device are selected from transceiver, speaker, microphone, keypad, video display, joystick, memory, transmitter, receiver or combinations thereof.

33. The computer program product of claim 32, wherein one or more features within the on-board computer provide substitute functions of the one or more disabled features within the mobile electronic device.

34. The computer program product of claim 33, further comprising:
obtaining instructions for obtaining data, using the on-board computer, about the status of conditions affecting the automobile; and
determining instructions for determining, using the on-board computer, which of the one or more features within the on-board computer to make available to a motorist.

35. The computer program product of claim 34, wherein the conditions are measured conditions selected from weather outside the automobile, speed of the automobile, braking frequency, distance to other vehicles, engine RPM, engine coolant level and temperature, steering wheel movement, automobile's acceleration, frequency of automobile's acceleration, time of day, time period of driving without a rest stop and combinations thereof.

36. The computer program product of claim 35, wherein the conditions are deduced conditions selected from traffic density, presence of a passenger, motorist fatigue and combinations thereof.

37. The computer program product of claim 34, wherein the determining instructions for determining of the features to make available to the motorist further comprises:
defining instructions for defining a normal value for each of the conditions and combinations of the conditions;
storing instructions for storing the normal value in a database of the on-board computer
storing instructions for storing application instructions in a database of the on-board computer for removing the availability of the features based upon a variance between the normal conditions and an actual condition and combinations of actual conditions;
determining instructions for determining the variance between the normal conditions and the actual conditions; and
removing instructions for removing the availability of the features based upon the application instructions.

38. The computer program product of claim 37, wherein the mobile electronic device is a mobile telephone and wherein the application instructions are selected from refusal to accept a mobile telephone call, refusal to place a mobile telephone call, placing only emergency mobile telephone calls, limiting the duration of a mobile telephone call, limiting the frequency of mobile telephone calls, limiting motorist input only to voice commands, blocking output to the visual display device or combinations thereof.

39. The computer program product of claim 27, further comprising:
communicating instructions for communicating instructions from the on-board computer to the mobile electronic device to disable one or more features within the mobile electronic device.

40. A method for controlling operation of a mobile telephone within an automobile having an on-board computer, comprising:
transmitting a wireless discovery signal from a transmitter controlled by the on-board computer;
receiving a wireless identification message from the mobile telephone, wherein the wireless identification message contains information describing the mobile telephone, and address for the mobile telephone, and an address for each of the one or more features within the mobile telephone;
establishing a wireless communication link between the on-board computer and the mobile telephone;
communicating instructions from the on-board computer to the mobile telephone to disable one or more features within the mobile telephone; and
communicating reconfiguration instructions from the on-board computer to the mobile telephone, whereby the mobile telephone reconfigures itself to become a slave device to the on-board computer.

41. The method of claim 40, wherein the one or more features disabled within the mobile telephone are selected from a speaker, a microphone, a display, a keypad, antenna or combinations thereof.

42. The method of claim 41, further comprising utilizing one or more features within the on-board computer to provide substitute functions for the one or more disabled features of the mobile telephone.

43. The method of claim 42, further comprising:
obtaining data, using the on-board computer, about the status of conditions affecting the automobile; and
determining, using the on-board computer, which of the one or more features within the on-board computer to make available to a driver of the automobile.

* * * * *

UNITED STATES PATENT AND TRADEMARK OFFICE
CERTIFICATE OF CORRECTION

PATENT NO. : 7,006,793 B2 Page 1 of 1
APPLICATION NO. : 10/046996
DATED : February 28, 2006
INVENTOR(S) : Maria Azua Himmel et al.

It is certified that error appears in the above-identified patent and that said Letters Patent is hereby corrected as shown below:

On title page (item 57)
In abstract, line 10, replace "disable a one" with the following:--disable one--.

Column 15, line 57, replace "mare" with the following:--more--.

Column 16, line 19, replace "byte on-bard" with the following:--by the on-board--.

Column 16, line 20, replace "forte" with the following:--for the--.

Column 16, line 24, replace "play,joystick" with the following:--play, joystick--.

Column 17, line 34, replace "from, the mobile" with the following:--from the mobile--.

Column 20, line 26, replace "telephone, and address" with the following:
--telephone, an address--.

Signed and Sealed this

Eighth Day of August, 2006

JON W. DUDAS
*Director of the United States Patent and Trademark Office*